Sept. 16, 1958     C. H. BECKER ET AL     2,852,189

COMPUTER FOR MACHINE TOOL CONTROL

Filed June 22, 1955     2 Sheets-Sheet 1

INVENTORS
CARL H. BECKER
ROBERT J. STAHL
BY *Lippincott and Smith*

ATTORNEYS

FIG-4

United States Patent Office 2,852,189
Patented Sept. 16, 1958

2,852,189

COMPUTER FOR MACHINE TOOL CONTROL

Carl H. Becker, Los Altos, and Robert J. Stahl, Redwood City, Calif., assignors to Textron, Inc., a corporation of Rhode Island Application June 22, 1955, Serial No. 517,308

11 Claims. (Cl. 235—61)

This invention relates to trajectory computers, and in particular to computing apparatus for controlling the trajectory or motions of a machine tool relative to a work piece in accordance with numerical input data.

It has previously been appreciated in the art of machine tool control that substantial advantages can be realized by the development of apparatus for the automatic processing of numerical product design data into signals suitable for continuously controlling the trajectory or motions of a machine tool relative to a work piece. Either the cutting tool or the work piece, or both, may be moved, depending upon the machine tool design. Accordingly, the tool motions herein described are motions of the cutting tool relative to the work piece, in which either or both may actually be moved. It will be appreciated that these motions may also define or control the trajectories of objects other than cutting tools, including but not limited to welding, spinning and grinding apparatus, and non-tool applications such as guided missiles.

In general, a machine tool has one or more feed or control input mechanisms, usually rotative shafts, which must be continuously adjusted, either manually or automatically, to provide a desired motion of the tool. A conventional milling machine, for example, has three such input mechanisms each controlling a component of tool motion in one of three mutually perpendicular directions. Thus, automatic control mechanism for such a milling machine must produce three time-varying motions or control signals which define the three-dimensional instantaneous rectangular coordinates of the cutting tool center. These control signals should be computed and generated automatically from a minimum quantity of numerical input data, of a form which can be obtained conveniently from blueprints or other product design information. Preferably, the control signals are recorded and stored on tape or the like, so that many articles of identical design can be made from one set of computations.

The development of such control apparatus has received considerable attention from those skilled in the art, and solutions for some of the many problems presented have previously been obtained. Means employing magnetic tape for the recording and play-back of machine tool control signals have been developed, using principles set forth in U. S. Patent No. 2,475,245, issued July 5, 1949 to E. W. Leaver et al. More recent developments of this type are described, for example, in an article "Tape-Controlled Machines" by Lawrence R. Peaslee, published in "Electrical Manufacturing," November, 1953; in an article "Magnetic Tape Programming of Machine Tools" by Lawrence R. Peaslee, published in "Machinery," January, 1954; and in a booklet GEA–6092 "Record Playback Control," published by General Electric Company, Schenectady, New York, March, 1954. However, according to the disclosure of the Leaver patent, the control signals or machine tool motions are initially obtained by manual operation of the machine tool: there is no disclosure of means for computing or generating these motions from numerical data. The article "Magnetic Tape Programming of Machine Tools" and the booklet GEA–6092 suggest that the control signals may be derived initially by computations from the numerical dimension of the product, but do not disclose specific apparatus for accomplishing this result automatically.

Accordingly, an object of this invention is to provide a computer for machine tool control which will automatically compute and generate the required time-varying control signals from numerical input data.

Another development is disclosed in a report, "A Numerically Controlled Milling Machine," Part 2, published by the Massachusetts Institute of Technology, Cambridge 39, Massachussetts, May 31, 1953. In the system described in this MIT report, the desired motions of the tool are approximated by a plurality of straight line segments. The projections of each segment on three orthogonal coordinate axes are computed prior to the entry of data into the system, and the numbers representing these projections are entered in coded form upon a punched tape by the manual operation of a keyboard. The cutting time for each segment must also be computed and entered on the tape. Computing and control apparatus is provided for reading the information stored on the punched tape and controlling three-dimensional motion of the cutting tool in a stepwise approximation of the straight line segments. It will be noted that the numerical information entered upon the tape according to the MIT machine control system is not of a form which can be quickly or cenveniently obtained from the product dimensions shown in conventional blueprints or other conventional design specifications. Furthermore, since straight line approximations are used, a great deal of input data is required to describe curved surfaces. Even simple machining operations may require that extensive computations be made preparatory to the entry of data upon the tape. It has been suggested (for example, on page 61 of the aforesaid report) that an automatic computer may be used to make some of these computations, but it appears that tape preparation according to the methods disclosed in this MIT report would still be a lengthy and tedious operation.

Accordingly, another object of this invention is to provide a computer for machine tool control capable of receiving and processing numerical data of a form readily obtainable from conventional product design information and automatically generating therefrom time-varying signals suitable for machine tool control.

Another development is described in a paper "A Digital-Analog Machine Tool Control System" by Harry W. Mergler, given at the Western Computer Conference, Los Angeles, California, February 11–12, 1954. This paper by Mergler describes a machine tool control system in which a general purpose digital computer is used to compute the coordinates at a plurality of data points along a desired profile which is to be machined. These coordinates are stored on punched cards, from which the information is transferred to an analog computer operated as an interpolating device to define a smooth curve passing through the selected data points. The analog computer generates time-varying control signals which may be recorded upon magnetic tape for subsequent use in the control of a machine tool. It will be noted that two computers are required in this system, since considerable computation is necessary to transfer the design data into a form acceptable to the analog computer. Furthermore, since the analog computer is merely an interpolating device, a relatively large number of data points are required to approximate a desired curve with high precision. Being especially designed for a specific job (the production of turbine blades), the data processing system described by Mergler seems to lack the flexibility needed in general purpose machining of the varied surface shapes commonly encountered in other product designs.

Accordingly, another object of this invention is to provide an improved analog computer for machine tool control operating directly from input data of a type commonly used in engineering drawings and designs, with a minimum amount of preliminary data processing.

Another object of this invention is to provide an improved analog computer for machine tool control which exactly defines a desired arcuate curve between successive data points, so that the number of data points and the amount of input data required is reduced to a minimum.

Another object is to provide an improved computer for machine tool control which is simpler, smaller, and more economical to manufacture than apparatus heretofore available for like purposes.

Another object of this invention is to provide an analog computer with digital error detection means to prevent the accumulation of errors during a sequence of analog computations.

Still another object of this invention in its broader aspects is to provide improved apparatus for computing trajectories of all types.

Other objects and advantages of the invention will appear as the description proceeds.

The surfaces most frequently encountered in engineering product designs consist of circular and straight segments, and other surfaces can be approximated by such segments. In engineering drawings and other design specifications, the radii of such segments are generally given, together with sufficient dimensions for determining the starting point, the stopping point, and the initial direction of each segment. To produce a desired surface with an automatically-controlled machine tool, a program must be established defining the trajectory or path of the tool center, and in general this trajectory also will comprise a succession of circular and straight line segments, which may be defined most conveniently in terms of their radii, starting points, stopping points, and initial directions. Numerical data defining a tool trajectory in this manner can generally be obtained with minimum effort from information available on standard engineering drawings or design specifications, making due allowance for the type and dimensions of the cutting tool. It is also necessary to specify the cutting speed or rate of travel of the tool. The present invention provides a trajectory computer capable of processing input information in this convenient form, and operable automatically to compute and generate therefrom time-varying rectangular coordinate signals suitable for the automatic control of a machine tool.

Briefly stated, in accordance with one aspect of this invention, an analog computer is provided with five individually adjustable input mechanisms which may be set to positions respectively representing the desired cutting speed or rate of travel of the tool, three angles defining the initial direction of a segment of the tool trajectory, and the radius of the segment. A straight line segment is represented as an arc of infinite radius. The analog computer operates automatically, through integrators and component resolvers interconnected as hereinafter described, to generate signals proportional to the velocity components of the desired tool motion in the directions of three rectangular coordinate axes, and also to adjust automatically an input direction angle as the arcuate segment is generated. The integrated velocity signals are added to the coordinates of the starting point to provide time-varying signals representing the instantaneous rectangular coordinates of the tool center. These signals may be recorded on magnetic tape and subsequently used to control the operation of the machine tool.

Other adjustable input mechanisms are provided on the computer which may be individually adjusted to three rectangular coordinate values defining the stopping point of the trajectory segment which is to be computed. Registers are provided for continuously indicating the differences between the instantaneous coordinates and the stopping point coordinates, and the computer may be automatically stopped when any one of these differences becomes zero. The other difference registers then indicate the computer error, so that this error may be corrected before the next successive trajectory segment is computed, to avoid cumulative errors.

The invention will be better understood from the following description taken in connection with the accompanying drawings, and its scope will be pointed out in the appended claims. In the drawings.

*General description of control system*

Figure 1:
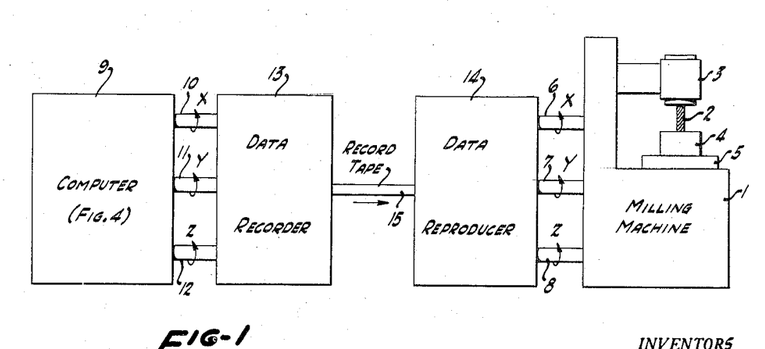
Fig. 1 is a block diagram showing a milling machine control system in which the computer of the present invention is particularly useful.

The purpose and functions of the computer with which this invention is concerned can best be appreciated in the light of a typical control system incorporating the novel computer. Referring now to Fig. 1 of the drawing, a milling machine 1 has a tool 2 which is continuously rotated by a motor 3 and which performs cutting operations upon a work piece 4 supported upon a table 5. The milling machine has three input mechanisms represented by shafts 6, 7 and 8 which may be rotated individually to produce three mutually perpendicular components of motion of tool 2 relative to work piece 4. Thus the angular positions of shafts 6, 7, 8 are time-varying signals, arbitrarily designated X, Y and Z, which represent three rectangular coordinate values continuously defining the instantaneous three-dimensional position of tool 2 relative to work piece 4. Milling machine 1 may have other input mechanisms for various purposes, such as starting and stopping motor 3, lubricating the tool, reorienting the work piece, and the like, but these functions of the milling machine are not material to the present invention, and may be controlled by manual operations or in any other desired manner.

The time-varying control signals X, Y, and Z are generated by a novel computer 9, illustrated in Fig. 4 and hereinafter more fully described, which rotates three shafts 10, 11, and 12 in a manner corresponding to the desired rotations of shafts 6, 7, and 8 to control the three-dimensional motion of tool 2 relative to work piece 4. Shafts 10, 11, and 12 could be connected directly by mechanical or servomechanism links to shafts 6, 7 and 8, but in practice it is generally preferable to employ a data storage system comprising a data recorder 13 and a data reproducer 14. The data recorder 13 converts the instantaneous angular positions of shafts 10, 11 and 12 into signals of a type which may be recorded conveniently, generally electrical signals, and records these signals on a record 15, which preferably is a magnetic tape but which may be any kind of data storage device, such as a perforated tape or a series of punched cards. Record tape 15 is subsequently fed into data reproducer 14, which converts the recorded information into angular positions of shafts 6, 7 and 8.

The data recording and reproducing system per se is not a part of the present invention, and may, for example, be constructed according to principles disclosed in U. S. Patent No. 2,475,245 issued to E. W. Leaver et al. on July 5, 1949. For example, the data recorder 13 may consist of the recording portion of the apparatus shown in Fig. 1 of the Leaver patent, expanded by a duplication of parts to have three mechanical inputs which are connected to shafts 10, 11, and 12 of applicant's computer, and provisions for recording three channels of shaft position information on the magnetic tape. Similarly, data reproducer 14 may consist of the "operate" or reproducing portion of Leaver's Fig. 1 apparatus, similarly expanded to read and interpret the three shaft position signals from the tape and to operate the three input shafts 6, 7 and 8 of the milling machine 1 shown in applicant's Fig. 1.

The use of a data storage system in place of direct connections between shafts 10, 11, 12 and shafts 6, 7 and 8 has several advantages. One advantage is that the record tape 15 may be run through the data reproducer 14 a plurality of times to produce many substantially identical machined articles. Another advantage is that the computer and data recorder may be located at a place remote from the data reproducer and machine tool. Another advantage is that computational and programming errors may be corrected by editing the record tape. Another advantage is that operation of the data recorder may be controlled by the computer, in a manner hereinafter explained, so that tape is sent through the recorder only while the computer is operating, and not while the computer is stopped to receive input data. Consequently, the machine tool may be operated continuously without loss of time while input data is being supplied to the computer. Another advantage is that the computer need not operate in real time. For example, the computer may rotate shafts 10, 11 and 12 at twice the desired velocity the shafts 6, 7 and 8, and thus may complete the computation of a trajectory segment in one-half the time required for the machine tool to move through the same segment. In this case, it is only necessary to run tape 15 through data recorder 13 at twice the speed that tape is run through data reproducer 14. Conversely, the computer may be operated at a fraction of the normal machine tool speed in order to achieve greater accuracy through higher ratios, reduced transients, increased stability and the like. Another advantage is that record tape 15 may be duplicated, by means known to those skilled in the magnetic recording art, so that a number of milling machines may be operated simultaneously from one set of computations.

*Mathematical relations*

Figure 2:
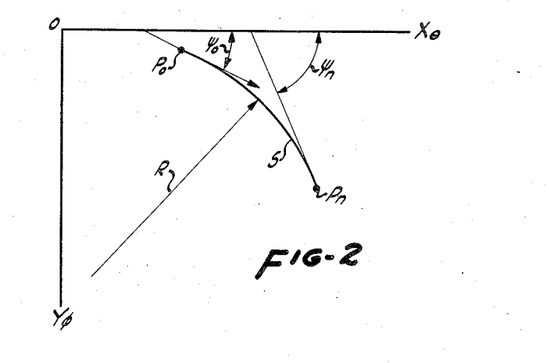
Fig. 2 is a diagram illustrating mathematical relationships hereinafter discussed.

A brief discussion of mathematical concepts will facilitate an understanding of the computer hereinafter described. Referring now to Fig. 2 of the drawing, a segment of the desired tool trajectory is represented by a circular arc S lying in a plane $X_\theta OY_\phi$ and extending between a starting point $P_0$ and a stopping point $P_n$. Arc S has a radius R, which for present purposes may be considered a constant. A point moving along arc S at a constant speed V, where V represents the cutting speed or rate of motion of the machine tool, has an initial direction in the plane $X_\theta OY_\phi$ which may be defined by an angle $\psi_0$ between the axis $X_\theta$ and a tangent to arc S through the point $P_0$. As the moving point moves along arc S, its instantaneous direction $\psi$ in plane $X_\theta OY_\phi$ changes constantly, until at point $P_n$ its direction is $\psi_n$. From the geometry of Fig. 2, several mathematical relations are evident. These are:

(Equation 1)
$$V = \frac{ds}{dt}$$

(Equation 2)
$$d\psi = \frac{1}{R}ds$$

(Equation 3)
$$\psi = \psi_0 + \int_0^t \frac{V}{R}dt$$

The significance of these relations will become apparent as the description proceeds.

Figure 3:
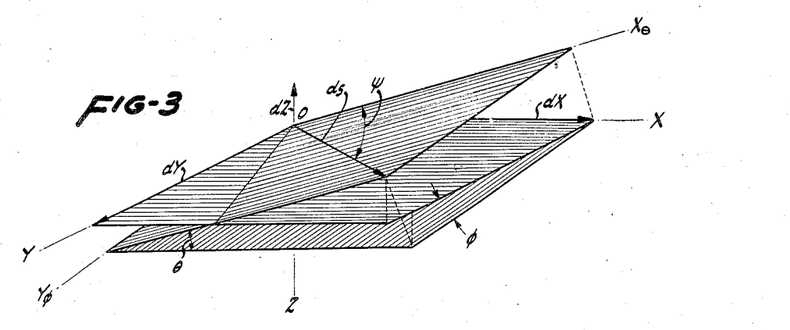
Fig. 3 is a diagram illustrating other mathematical relationships hereinafter discussed.

Referring now to Fig. 3 of the drawing, the mutually perpendicular axes X, Y and Z, which intersect at the origin O, define a rectangular coordinate system having the same orientation in space as a coordinate system having three axes, arbitrarily designated X, Y and Z, corresponding in direction to the three components of motion of the machine tool produced by rotating shafts 6, 7 and 8. Within this rectangular coordinate system, a reference plane XOY may conveniently be horizontal, but may be vertical or have any other orientation in space depending upon the orientation of the XYZ coordinate system of the machine tool. The plane $Y_\theta OY_\phi$ has an orientation in space determined by the orientation of arc S (Fig. 2), and may have any orientation with respect to the reference plane XOY. The relative orientation of planes $X_\theta OY_\phi$ and XOY may be defined by two dihedral angles $\theta$ and $\varphi$ as shown, such that plane XOY can be moved to the orientation $X_\theta OY_\phi$ by first rotating the Y and Z axes about the X axis with an angle $\phi$, and then rotating the X axis and the new Z axis about the $Y_\phi$ axis with an angle $\theta$. Since any plane parallel to $X_\theta OY_\phi$ is considered to have the same orientation in space as $X_\theta OY_\phi$, the two angles $\theta$ and $\phi$ can be used to define the orientation in space of any plane relative to the reference plane XOY.

The starting point and the stopping point of each trajectory segment are located in space by their rectangular coordinates in the XYZ coordinate system. For example, the location of point $P_0$ is defined by the coordinate values $X_0$, $Y_0$, $Z_0$; and the location of point $P_n$ is defined by the coordinate values $X_n$, $Y_n$, $Z_n$.

Now consider an infinitesimal length $ds$ of the arc S. Since the direction of $ds$ is the same as the direction of a point moving along arc S, the angle $\psi$ defines the direction of $ds$ in the plane $X_\theta OY_\phi$. Consequently, the angles $\psi$, $\theta$ and $\phi$ define the instantaneous direction of motion at any point in the desired three-dimensional trajectory of the machine tool. These angles are analogous to the yaw, pitch, and roll angles of an Euler coordinate system frequently used in aircraft and missile engineering.

Since the vector $ds$ represents an infinitesimal motion along the desired trajectory of the machine tool, the projections, $dX$, $dY$ and $dZ$ of the vector $ds$ on the X, Y and Z axes of the reference coordinate system are desired. These projections are given by the following equations:

(Equation 4)
$$dX = \cos \psi \cos \theta \, ds$$

(Equation 5)
$$dY = (\sin \psi \cos \phi + \cos \psi \sin \theta \sin \varphi) \, ds$$

(Equation 6)
$$dZ = (\sin \psi \sin \phi - \cos \psi \sin \theta \cos \phi) \, ds$$

The time-varying instantaneous rectangular coordinates of a point moving along the desired trajectory at a speed V are now desired. These coordinates have time-varying values which are defined by the following equations:

(Equation 7)
$$X = X_0 + \int_0^t (\cos \psi \cos \theta) V dt$$

(Equation 8)
$$Y = Y_0 + \int_0^t (\sin \psi \cos \phi + \cos \psi \sin \theta \sin \phi) V dt$$

(Equation 9)
$$Z = Z_0 + \int_0^t (\sin \psi \sin \phi - \cos \psi \sin \theta \cos \phi) V dt$$

The three Equations 7, 8 and 9 above given define the control signals which are generated by computer 9 in the form of angular positions of shafts 10, 11 and 12. By making arbitrary changes in the directions of the X, Y and Z axes, or by defining the direction angles $\psi$, $\theta$ and $\phi$ in different but equivalent ways, the algebraic sign of certain terms in the above equations may be reversed, in some cases cosine functions may be substituted for sine functions and vice versa, or other transformations may be made without changing the basic nature of the above mathematical relationships or departing from the broader inventive principles of the novel computer herein disclosed.

Description of basic analog computer

Figure 4:
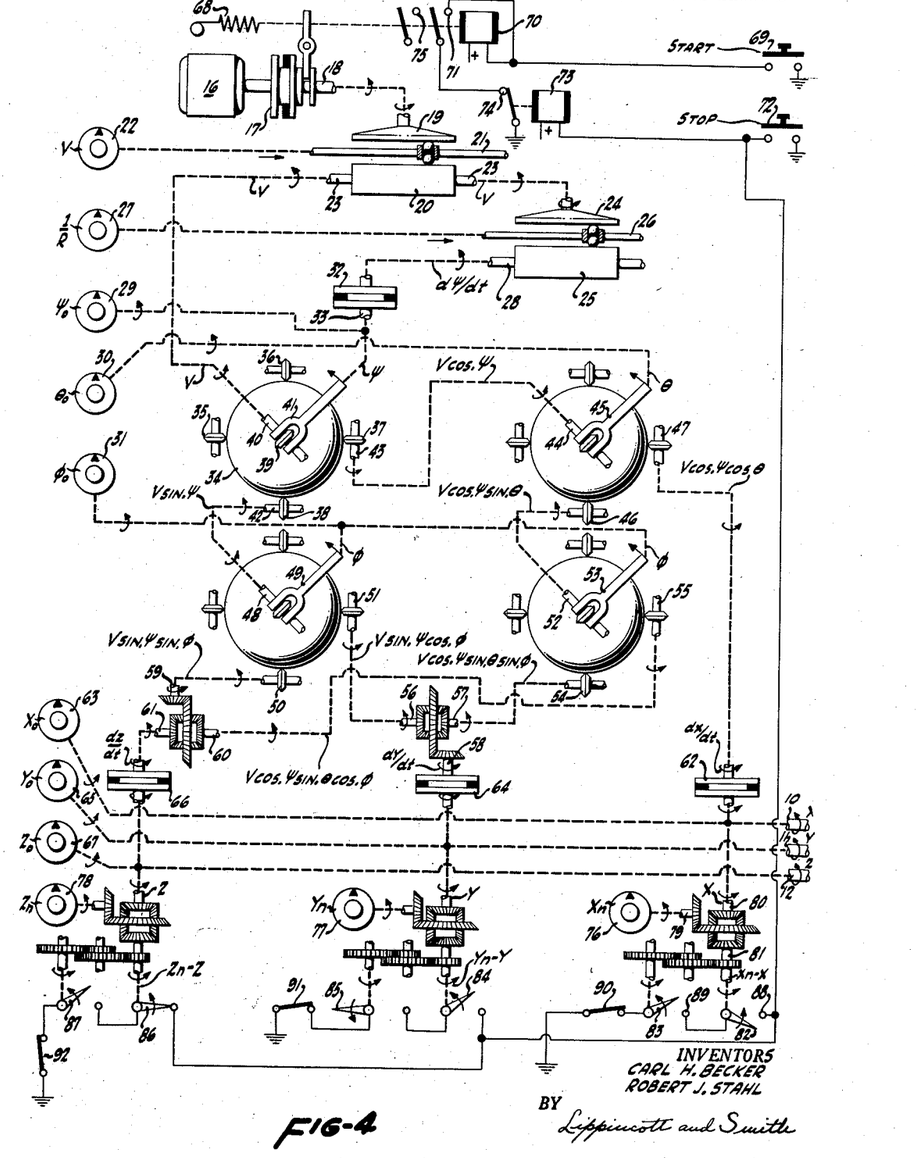
Fig. 4 is a simplified schematic diagram of a computer embodying principles of the present invention.

A simplified schematic diagram illustrating a preferred embodiment of the computer 9 is shown in Fig. 4 of the drawing. Referring now to Fig. 4, the basic computer comprises a master motor, a plurality of integrators, a plurality of component resolvers, and a plurality of differentials, mechanically connected or linked together in the manner indicated by broken lines in the drawings. Arrows are placed adjacent to various parts to indicate positive directions of motion. Negative quantities are represented by motion in a direction opposite to that indicated by the arrows.

For an understanding of the operating principles of the computer, it may be assumed that the broken lines in Fig. 4 represent direct mechanical connections through shafts, gears and the like. In actual practice however, some or all of these connections are preferably made by means of motion-transmitting torque-amplifier servomechanisms which automatically position a driven shaft or other movable part in accordance with the angular position of a driving shaft. The purpose of such torque-amplifying servomechanisms is to avoid excessive loading of the computer element outputs, which would tend to produce slippage at points of frictional engagement and thus introduce computer inaccuracies. Since torque-amplifying servomechanisms of many different suitable types are well known to those skilled in the art, and of themselves are not part of the present invention, the torque-amplifiers are not described herein; and in the following description it will be assumed that direct mechanical linkages are provided between the various computer elements.

A motor 16, which may be a small synchronous electric motor, operates through a clutch 17 to rotate a shaft 18 at a constant speed when the computer is placed in operation by closing clutch 17. A first integrator, of a well-known conventional type, in this instance used as a variable ratio drive, comprises a disc 19, a cylinder 20, and two balls carried by a slide or carriage 21, as shown. Disc 19 is linked to shaft 18 so that the integrator disc is rotated at a constant angular velocity when clutch 17 is closed. Slide 21 is linked to an input mechanism 22, which may be a manually adjustable dial calibrated in terms of the cutting speed V or desired rate of three-dimensional motion of the machine tool. As disc 19 rotates, motion is transmitted through the two balls of slide 21 to the cylinder 20, so that a shaft 23 connected to cylinder 20 is rotated at an angular velocity proportional to V. With this arrangement, the value of V may be adjusted through a continuous range of cutting speeds. Alternatively, an electrical speed adjusting method of a well-known type may be applied to motor 16. In actual practice, a stepwise adjustment of the cutting speed to any one of a plurality of discrete values is generally satisfactory, in which case the integrator 19, 20, 21 may be replaced by a simple gear-shift mechanism.

A second integrator of a similar type comprises a disc 24, a cylinder 25, and a pair of balls carried by a slide 26. Disc 24 is linked to shaft 23, preferably through a torque-amplifier servomechanism, and thus is rotated at an angular velocity proportional to V. The slide 26 is linked to an input mechanism 27, which may be a manually adjustable dial calibrated in terms of the reciprocal of the radius R of a trajectory segment which is to be computed. For convenience, the actual values marked upon the dial may be proportional to R, with the calibration marks so arranged that the radial distance between the balls of slide 26 and the center of disc 24 is proportional to the reciprocal of R. Motion is transmitted from disc 24 through the two balls of slide 26 to cylinder 25, so that a shaft 28 connected to cylinder 25 is rotated at an angular velocity proportional to $$\frac{V}{R}$$

From Equations 1 and 2, it will be seen that $$\frac{V}{R}$$

is equal to $$\frac{d\psi}{dt}$$

so that the angular velocity of shaft 28 is proportional to the rate of change of the direction angle $\psi$.

Three other input mechanisms may consist of three manually adjustable dials 29, 30, and 31, calibrated in terms of the three direction angles $\psi_0$, $\theta_0$, $\phi_0$, respectively, which define the initial direction of an arcuate trajectory segment. Shaft 28 and dial 29 are linked together through a clutch 32 which may be opened for the purpose of rotating dial 29 to set up the initial direction angle $\psi_0$ as an angular position of a shaft 33 connected to the output of clutch 32. Alternatively, a differential gear may be used for adding the angular positions of shaft 28 and dial 29 and thus positioning shaft 33. After the initial value of $\psi_0$ has been set on dial 29, clutch 32 is closed and thereafter shaft 33 is rotated by shaft 28 at an angular velocity proportional to $$\frac{d\psi}{dt}$$

It will be seen from Equation 3 that the angular position of shaft 33 is thus proportional at all times to the instantaneous value of the angle $\psi$.

A component resolver of a conventional type (such as is shown on page 25 of the book "Computing Mechanisms and Linkages" by A. Svoboda, 1948 edition, published by McGraw-Hill Book Co., volume 27 of the Massachusetts Institute of Technology Radiation Laboratory Series) comprises a ball 34 rotatively supported by six wheels. Four of these wheels, identified in the drawing by reference numerals 35, 36, 37 and 38, are oriented in fixed positions at a 90° spacing around the periphery of ball 34 in a diametric plane of the ball. A fifth wheel 39 is positioned at the top of the ball 34 in a position orthogonal to the wheels 35, 36, 37 and 38, and is attached to a rotative shaft 40 supported by a yoke 41 which can be rotated about a vertical diameter of wheel 39 to adjust the angular orientation of wheel 39 relative to ball 34. The sixth wheel, not shown, is positioned at the bottom of the ball parallel to wheel 39, so that ball 34 can rotate freely responsive to rotation of wheel 39. Yoke 41 is part of the angle input mechanism of the resolver, which is linked to shaft 33 so that the angular orientation of wheel 39 is equal to the direction angle $\psi$. A link between shafts 23 and 40, preferably a torque-amplifier servomechanism, rotates wheel 39 at an angular velocity proportional to V. In consequence, a shaft 42 connected to wheel 38 is rotated at an angular velocity proportional to $V \sin \psi$, and a shaft 43 connected to wheel 37 is rotated at an angular velocity proportional to $V \cos \psi$. Accordingly shaft 40 is the input shaft of the resolver, yoke 41 represents the angle input mechanism of the resolver, and shafts 42 and 43 are the sine and cosine output shafts of the resolver.

Another component resolver of the same type has an input shaft 44, an angle input mechanism 45, a sine output shaft 46, and a cosine output shaft 47. A linkage between shafts 43 and 44 rotates the input shaft 44 at an angular velocity proportional to $V \cos \psi$. A linkage between angle input mechanism 45 and dial 30 adjusts the angle input mechanism 45 to an angular position equal to the angle $\theta$. Consequently, the sine output shaft 46 is rotated at an angular velocity proportional to $V \cos \psi \sin \theta$, while the cosine output shaft 47 is rotated at an angular velocity proportional to $V \cos \psi \cos \theta$. From Equations 1 and 4 it will be noted that the angular velocity of shaft 47 is proportional to $$\frac{dX}{dt}$$

Another component resolver of the same type has an input shaft 48, an angle input mechanism 49, a sine output shaft 50 and a cosine output shaft 51. A linkage between shaft 42 and shaft 48 rotates input shaft 48 at an angular velocity proportional to $V \sin \psi$. Angle input mechanism 49 is linked to dial 31 and is thereby adjusted to an angular position representing the angle $\phi$. Consequently, sine output shaft 50 is rotated at an angular velocity proportional to $V \sin \psi \sin \phi$, and cosine output shaft 51 is rotated at an angular velocity proportional to $V \sin \psi \cos \phi$.

Still another component resolver of the same type has an input shaft 52, an angle input mechanism 53, a sine output shaft 54, and a cosine output shaft 55. A linkage between shaft 46 and shaft 52 rotates the input shaft 52 at an angular velocity proportional to $V \cos \psi \sin \theta$. The angle input mechanism 53 is linked to dial 31 and thereby is adjusted to an angular position equal to the angle $\phi$. Consequently, sine output shaft 54 is rotated at an angular velocity proportional to $V \cos \psi \sin \theta \sin \phi$ and the cosine output shaft 55 is rotated at an angular velocity proportional to $V \cos \psi \sin \theta \cos \phi$.

A differential gear "adder" has an input shaft 56 linked to shaft 51 and an input shaft 57 linked to shaft 54. This differential gear is arranged to add the angular motions of its two input shafts, and to rotate an output shaft 58 at an angular velocity proportional to $$V \sin \psi \cos \phi + V \cos \psi \sin \theta \sin \phi$$

From Equations 1 and 5 it will be noted that this angular velocity is proportional to $$\frac{dY}{dt}$$

A differential gear "subtractor" has an input shaft 59 linked to shaft 50 and another input shaft 60 linked to shaft 55. This second differential gear is arranged to subtract the angular motions of its input shafts, and rotates its output shaft 61 at an angular velocity proportional to $V \sin \psi \sin \phi - V \cos \psi \sin \theta \cos \phi$. From Equations 1 and 6 it will be noted that this angular velocity is proportional to $$\frac{dZ}{dt}$$

Shaft 47, which rotates at an angular velocity proportional to $$\frac{dX}{dt}$$

as hereinbefore explained, is linked through a clutch 62 to the computer output shaft 10. Shaft 10 is also linked to an input mechanism which may be a manually adjustable dial 63 calibrated in terms of the coordinate $X_0$ of the starting point of the arcuate trajectory segment to be computed. Before the beginning of a series of computations, clutch 62 is opened and the value of the initial coordinate $X_0$ is set on dial 63. Clutch 62 is then closed, and thereafter shaft 10 is rotated at an angular velocity proportional to $$\frac{dX}{dt}$$

Consequently, referring to Equation 7, it will be noted that the angular position of shaft 10 represents at all times the value X of one rectangular coordinate defining the desired instantaneous position of the cutting tool.

Shaft 58, which rotates at an angular velocity proportional to $$\frac{dY}{dt}$$

is linked through a clutch 64 to the computer output shaft 11. Shaft 11 is also linked to an input mechanism which may be a manually adjustable dial 65 calibrated in terms of the starting point coordinate $Y_0$. Before a series of computations is started, clutch 64 is opened and the initial coordinate $Y_0$ is set on dial 65. Clutch 64 is then closed, and thereafter shaft 11 is rotated at an angular velocity proportional to $$\frac{dY}{dt}$$

so that, as is shown by Equation 8, the angular position of shaft 11 represents at all times the value of the rectangular coordinate Y defining the desired instantaneous position of the cutting tool.

Shaft 61, which rotates at an angular velocity proportional to $$\frac{dZ}{dt}$$

is linked through a clutch 66 to the output shaft 12 of the computer. Shaft 12 is also linked to an input mechanism which may be a manually adjustable dial 67 calibrated in terms of the starting coordinate $Z_0$. Before the start of a series of computations, clutch 66 is opened and the initial coordinate $Z_0$ is set on dial 67. Clutch 66 is then closed, and thereafter shaft 12 is rotated at an angular velocity proportional to $$\frac{dZ}{dt}$$

Referring now to Equation 9, it will be seen that the angular position of shaft 12 represents at all times the value of the coordinate Z defining the desired instantaneous position of the cutting tool.

From the foregoing it will be seen that the angular positions of shafts 10, 11 and 12 are time-varying signals, automatically generated by the computer, which are proportional at all times to the rectangular coordinate values which define desired instantaneous positions of a machine tool moving along an arcuate trajectory of radius R having any desired orientation in space. Straight-line segments are treated as arcs of infinite radius, and are computed either by setting R equal to infinity $$\left(\frac{1}{R} \text{ equal to zero}\right)$$

on dial 27, or by holding clutch 32 open while the computer is operated.

The computer is stopped and started by opening and closing the clutch 17. Clutch 17 is biased to an open position by a spring 68; and while clutch 17 is open, motor 16 is disconnected from shaft 18 so that the computer does not operate. While clutch 17 is open, the input mechanisms of the computer are adjusted to set up the desired cutting speed V, the segment radius R, the three initial direction angles $\psi_0$, $\theta_0$ and $\phi_0$, and the starting point coordinates $X_0$, $Y_0$ and $Z_0$. The computer is then started by momentarily depressing a push-button 69 which completes an electric circuit to energize the "start" solenoid 70. When energized, solenoid 70 closes clutch 17 and connects motor 16 to shaft 18, whereupon the computer operates to rotate shafts 10, 11, and 12 in the manner hereinbefore explained to generate the three time-varying signals needed for controlling the three-dimensional motions of a machine tool. When solenoid 70 is energized, a holding contact 71 is closed, which completes a holding circuit to keep the "start" solenoid 70 energized after push-button 69 is released.

The computer may be stopped at any time by depressing a push-button 72 which completes an electrical circuit to energize a "stop" relay 73 having a normally closed contact 74 connected in the holding circuit of solenoid 70. When relay 73 is energized, the holding circuit is broken and solenoid 70 is de-energized until push-button 69 is again depressed. The computer may also be stopped automatically in a manner hereinafter described.

Solenoid 70 also closes a normally open contact 75 when the computer is in operation. Contact 75 may be connected in an electrical circuit which controls the tape drive mechanism of data recorder 13 (Fig. 1), so that tape is fed through the data recorder only while the computer is operating. As a result, only useful shaft-position signals are recorded on record tape 15, so that a machine tool subsequently controlled by the tape is kept in substantially constant motion from one trajectory segment to the next even though the computer may be operated intermittently with relatively long stops between the computed segments while new input data is being supplied.

It should be appreciated that the computer elements per se, such as the integrators, component resolvers, clutches, and differential gears, were previously known; but that the arrangement and organization of these elements as herein described form a novel trajectory computer which is particularly useful for the control of machine tools in an advantageous manner not known heretofore. Accordingly, equivalent devices of types other than the specific integrators, component resolvers, clutches, differential gears and the like herein disclosed may be substituted without departing from broad principles of this invention, and motions of other types may be used in place of shaft rotations. Furthermore, analogous electrical or other computing elements may be used in place of mechanical elements. For example, electric currents may be used in place of shaft rotations, and well-known electrical means may be employed for integrating such currents and for performing functions of the component resolvers.

In computers designed specifically for specialized applications where one or more of the direction angles $\psi$, $\theta$ and $\phi$ is invariant, one or more of the component resolvers may be omitted. By way of illustration, in the case of two-dimensional trajectories which always lie in the X O Y reference plane—for example, in the control of a lathe having a cutting tool which moves in only two directions—the angles $\theta$ and $\phi$ are always equal to zero. In such a case the cosine output shaft 43 and the sine output shaft 42 of the first or $\psi$ component resolver may be directly linked to the X output shaft 10 and the Y output shaft 11, respectively, and the other three component resolvers may be omitted. In other cases, the versatility of the computer can be increased by the addition of other elements and optional features, as is hereinafter explained.

*Description of digital error-checking apparatus*

The computing apparatus thus far described is a novel and useful analog computer which generates time-varying signals representing the instantaneous rectangular coordinates of a point moving along a three-dimensional trajectory composed of successive arcuate and straight line segments. In common with other analog devices, this computer is subject to certain small errors, due to slippage of the frictionally-engaged wheels in the computer elements, inaccuracies in positioning, and the like, which in some cases could result in substantial cumulative errors during the computation of long or complex trajectories if some means to prevent the accumulation of errors were not provided. To prevent the accumulation of errors in this manner, and for other purposes which will become apparent as the description proceeds, novel error-checking means are provided, which will now be explained.

Three adjustable input devices, which may be manually adjustable dials 76, 77, and 78, are provided for registering the stopping point coordinates of a trajectory segment. Before starting the computation of any segment, the rectangular coordinate values $X_n$, $Y_n$ and $Z_n$ of the stopping point are set on dials 76, 77 and 78 respectively. During the computation, these dials continuously register constant signals which are continuously compared with the time-varying signals X, Y, and Z in the following manner:

A differential gear "subtractor" has an input shaft 79 linked to dial 76, and another input shaft 80 linked to output shaft 10 of the computer. The differential gear is arranged to subtract the angular positions of these two shafts, and automatically to adjust an output shaft 81 to an angular position representing the difference $X_n - X$ between the stopping point X axis coordinate value and the instantaneous X axis coordinate value. This difference is continuously displayed by a pointer 82 linked to shaft 81. If desired, a calibrated scale, not shown, may be placed adjacent to pointer 82 for continuously indicating the numerical or digital value of this difference. Since shaft rotations of more than 360 degrees may be provided, the position of pointer 82 alone might under some circumstances be ambiguous. To prevent such ambiguity, a second pointer 83 is linked to shaft 81 through a train of reducing gears, as shown. When shaft 81 and pointer 82 rotate through a full revolution, pointer 83 rotates through only a fraction of a revolution, so that the combined positions of pointers 82 and 83 represent a multidigit number indicating the instantaneous value of the quantity $X_n - X$. Any desired number of additional pointers may be added in the same way, to represent a difference number having any desired number of digits.

In a similar manner, dial 77 and shaft 11 are linked through a differential gear "subtractor" to pointers 84 and 85 which continuously display the difference value $Y_n - Y$. Similarly, dial 78 and shaft 12 are linked through a differential gear "subtractor" to pointers 86 and 87 which continuously display the difference value $Z_n - Z$. When all of the three difference values are zero, all of the pointers 82, 83, 84, 85, 86 and 87 are in a horizontal position pointing toward the right. When any one of the difference values is not equal to zero, at least one of the corresponding pointers is in some other angular position.

Assume that the stopping point coordinates have been set on dials 76, 77 and 78, and that the computation of a trajectory segment has started. The computer continues to operate until any one of the three difference values becomes equal to zero. Now assume that the difference $X_n - X$ becomes equal to zero. Pointers 82 and 83 are both in a horizontal position pointing toward the right, and electrical contacts at 88 and 89 are closed. This completes an electrical circuit which energizes stop relay 73, whereupon the holding circuit to solenoid 70 is broken, solenoid 70 is de-energized, and clutch 17 is opened by spring 68 to stop operation of the computer. If there has been no computer error during the computation of this trajectory segment, the differences $Y_n - Y$ and $Z_n - Z$ will also be equal to zero, and the pointers 84, 85, 86 and 87 will indicate this fact. If there has been a computer error, the magnitude of the error will be revealed by the differences $Y_n - Y$ and $Z_n - Z$ which are displayed by pointers 84, 85, 86 and 87. Appropriate steps may now by taken to correct the error, depending upon the tolerances and the nature of the job to be performed by the machine tool. In most instances the error will be small, and will be within the specified tolerances of the job. In this case, any one of several procedures may be adopted.

One procedure for preventing the accumulation of small computer errors is to open clutch 62 so that there will be no further change in the X axis coordinate value, open switch 90 to de-energize the stop relay, and push start button 69 to restart the computer. The computer will then continue to operate until one of the other difference values becomes zero, whereupon the same procedure may be repeated to make all three of the differences, $X_n - X$, $Y_n - Y$, and $Z_n - Z$, equal to zero.

Another procedure which may be adopted is merely to push start button 69 so that the computer will restart whereupon the $X_n-X$ difference is automatically changed to a value other than zero by operation of the computer and relay 73 is de-energized so that the computer will continue to operate until one of the other difference values becomes zero, and will then stop again. This may provide smaller differences than were originally present, especially when the motion is almost parallel to the axis corresponding to the difference value which first became zero.

Still another procedure is to compute a new trajectory between the actual stopping and the desired stopping point to bring the machine tool to the desired position. For example, this may be done by re-setting input dials 27, 29, 30 and 31 to compute a straight-line segment between the actual stopping point and the desired stopping point. Alternatively, an arcuate segment may be computed, depending upon the nature of the machining job to be performed.

Still another procedure is to adopt the actual stopping point as the starting point for the next trajectory segment of the original program, making sufficient corrections in the radius and the initial direction of the next segment to compensate for the error in the preceding segment.

If the difference values displayed by pointers 82—87 are too large, indicating a computer error which is in excess of the specified tolerances, the computer input mechanisms may be reset to the initial values from which the segment computations were started, and the segment may be recomputed. This may be repeated as many times as desired until a computation is performed which is within the required tolerances. The erroneous computations may then be edited from tape 15 by cutting and splicing the tape, or if the tape recording mechanism has erasing provisions, the tape may be erased and backed up at the conclusion of each erroneous computation to remove the errors from the tape.

In some cases it may be desired that the computer stop only when a specified one of the difference values becomes equal to zero. This can be accomplished by opening all but one of the three switches 90, 91 and 92. For example, if it is desired that the computer operate until $Y_n-Y$ becomes equal to zero, and then stop, switches 90 and 92 are opened, while switch 91 remains closed. If all three switches 90, 91 and 92 are opened, the computer will operate until "stop" push button 72 is depressed.

The error-checking apparatus herein described adds digital accuracy to a simple and convenient analog computer, with many consequent advantages. High accuracy, usually found only in large, complex digital computers, is provided in a small, simple, essentially analog apparatus. On the other hand, analog computer advantages are retained, including continuously-variable (rather than stepwise) outputs, simplicity and reliability of components, and exceptional operating convenience.

Numerous variations and elaborations in the error-checking apparatus are possible. For example, commutator-type "digitalizers" may be used for converting the output shaft positions into electrical signals representing binary, octal or decimal numbers. Electronic counting registers may be provided for storing the stopping-point coordinates, and electronic subtracting registers may be employed to derive numbers representing the three difference values $X_n-X$, $Y_n-Y$ and $Z_n-Z$.

*Typical operating procedure*

The computer described is sufficiently versatile that numerous variations are possible in the procedure for its use in automatic machine tool control and for other purposes. One procedure which may be used is as follows:

From an engineering drawing or other design specifications of a part to be machined, a three-dimensional trajectory is programmed which the center of the cutting tool should follow to produce the desired product shape. This trajectory is subdivided into successive straight-line and arcuate segments. The starting and stopping point coordinates of each segment, the Euler coordinate angles defining the initial direction of each segment, and the radius of each segment are determined. The cutting speed desired of the machine tool is also specified. This information provides the input date which must be supplied to the computer.

Programming a tool trajectory in this manner is relatively simple compared to procedures necessary with prior automatic control apparatus. For example, a complete circle can be specified by the starting (and stopping) point coordinates, the initial direction angles, and the radius. Usually such information for a trajectory segment is easily obtainable from product dimensions or other design specifications. Furthermore, only a small part of the input information changes from one trajectory segment to the next. The starting point coordinates for one segment are usually identical to the stopping point coordinates for the preceding segment. When successive segments lie in the same plane, there need be no change in direction angles $\theta$ and $\phi$.

When a program has been prepared, the data for computing the first segment is entered on the input mechanisms of computer 9, start button 69 is depressed and the computer proceeds to compute the first segment. As the segment is computed, shafts 10, 11 and 12 are rotated by the computer to angular positions representing the instantaneous rectangular coordinate values defining the desired instantaneous positions of machine tool 2. These angular positions are converted to a form suitable for recording by data recorder 13, and are recorded on record tape 15.

When any one of the coordinate values X, Y and Z becomes the same as the corresponding coordinate value $X_1$, $Y_1$ or $Z_1$ of the first stopping point, previously set on dials 76, 77 and 78, the computer stops and the difference registers may be inspected to determine whether or not the computer error is within the specified tolerances. Assuming that it is, any small error present is corrected according to procedures hereinbefore described, to prevent the accumulation of errors, and the input data for computing the second segment is then entered on the computer input mechanisms.

Usually it will not be necessary to readjust all of the computer inputs between successive segment computations. For example, operation of the computer in generating signals defining the first segment automatically brings the adjustment of dials 63, 65 and 67 to the coordinate values $X_1$, $Y_1$, $Z_1$ defining the first stopping point, which will generally be the starting point for the next segment of the trajectory. Similarly, the cutting speed V will need readjustment only at infrequent intervals. The radius R may have to be readjusted, and one or more of the direction angles $\psi_0$, $\theta_0$ $\phi_0$ may have to be readjusted. Also, the coordinates of the second stopping point must be set on the dials 76, 77 and 78.

When the new input data has been entered, "start" push-button 69 is again depressed and signals representing the second segment of the trajectory are generated. The operator proceeds in this manner until signals representing the entire trajector have been generated and recorded upon tape 15. Tape 15 may be fed into data reproducer 14 at any time, and the desired machine operations will be produced automatically by milling machine 1.

An especial advantage of this computer lies in the fact that the input data is of a form which may be readily obtained from numerical information commonly found in blueprints and other engineering specifications. For example, assume that reference plane XOY (Fig. 3) is horizontal. Whenever a trajectory segment lies in a horizontal plane, angles $\theta$ and $\phi$ are both zero and angle $\psi$ is an azimuth angle which may be readily determined, for example, by noting the direction of a line on the drawing relative to arbitrarily selected coordinate axes defining the desired orientation of the work piece in the machine tool. If a trajectory segment lies in a vertical plane, angle $\phi$ may be set at 90 degrees, in which case angle $\theta$ will be an azimuth angle defining the intersection of the vertical plane with the horizontal reference plane, and angle $\psi$ will be a negative elevation angle. The Euler coordinate angles for segments lying in oblique planes are only slightly more difficult to determine.

In the case of straight-line segments, the radius R is infinity. In the case of curved segments, the radius R is commonly given in the engineering design data, or can be obtained readily. For example, to machine a discoid surface, a trajectory may be selected which includes a plurality of concentric circular segments. The radius of the outer segment is determined by the radius of the desired surface, and the radius of each succeeding segment is obtained by subtracting from the preceding radius an amount depending upon the desired spacing between successive cuts. The circular segments may be connected by short straight-line radial segments to define a complete trajectory for machining the surface. Coordinates of the stopping points can generally be obtained without much difficulty from the product dimensions. Since a complete circle of an arc of any length, having any desired orientation in space, or a straight line of any length having any desired orientation in space, can be generated with only one stopping point, the amount of input data which must be supplied to the computer is kept to a minimum and is significantly less than that required according to prior proposals.

Optional computer features

Since any complex machine tool trajectory can be approximated closely by successive circular arcs, the simple computer thus far described can be used to control machine tool operations of great complexity. For convenience, however, certain additional features may advantageously be added for computing special commonly-encountered shapes from a minimum amount of input information.

It may be desired, for example, to have the machine tool follow a planar spiral trajectory. This can be accomplished, of course, by specifying a large number of successive circular arcs, the approximation to a true spiral path becoming progressively better as the number of circular segments is increased. This would be somewhat laborious to the computer operator, since there would be many stopping points and a correspondingly large amount of input data to be supplied to the computer. By a slight modification of the computer, which may be added as an optional feature and which will in no way detract from normal use of the computer, spirals and the like can be generated from a single set of input data. This can be accomplished simply by providing an additional integrator driven by shaft 23 and having its output linked to dial 27 through a non-linear linkage such as a cam and cam follower for converting R to the reciprocal of R and an added clutch, so that this added clutch, which is normally open, may be closed to vary R continuously as a function of time. The side of the added integrator may be linked to an adjustable dial for setting the rate $$\frac{dR}{dt}$$

at which R is varied.

If desired, provisions may also be added for varying R in accordance with other specialized functions, which may be functions of time or functions of some other quantity such as one of the direction angles or one of the output rectangular coordinate values. By such means parabolas, ellipses and other planar non-circular trajectory segments may be generated with minimum amounts of input data.

In some cases it may be convenient to vary automatically one of the other direction angles $\theta$ or $\phi$ in place of the angle $\psi$. For this purpose, additional clutches may be provided between shaft 28 and the dials 30 and 31. By such means either the angle $\theta$ or the angle $\phi$ may be varied as a function of time. For example, if clutch 32 is opened and one of the additional clutches is closed to link shaft 28 with input dial 30, a helical trajectory will be generated about the $Y_\phi$ axis, having a helix radius R and a pitch angle $\psi$. If $\psi$ is equal to zero, the trajectory will be a circular arc in the $XOZ_\phi$ plane.

Other optional features may be added to the computer which make it possible to generate many other trajectories which do not lie in any one plane. This can be accomplished, for example, by the use of additional integrators and clutches linking dials 30 and 31 to shaft 23 in the same manner that dial 29 is linked to shaft 23. With this arrangement, angles $\psi$, $\theta$ and $\phi$ may be varied continuously at the same time and at different rates. When such variations are not desired, the clutches are opened or, alternatively the slides of the respective integrators would be set to the zero position in which the balls are at the center of the input disk. Other optional interconnections are possible, including connections for varying any one of the input quantities in accordance with variations of an output signal, such as the rotation of shaft 10, or with variations of any other quantity present in the computer or otherwise available.

Provisions may be made for improving the accuracy of the computer in special cases, or for providing a simplified computer limited to special work such as two-dimensional control. For example, when operating in a plane parallel to reference plane XOY, the values of $\theta$ and $\phi$ are both zero, and consequently only the $\psi$ component resolver is working actively. In such cases, alternative linkages may be provided in the form of clutches for bypassing the unused computer components to eliminate any inaccuracies or errors which might arise in the inactive components. Another optional feature is the provision of means whereby the angles, $\psi$, $\theta$ and $\phi$ control the orientation in space of machine tool 2 as well as its three-dimensional motion. For example, angles $\theta$ and $\phi$ can be used to operate control mechanism for orienting machine tool 2 in a direction normal to the plane of the cut whenever such orientation is required.

Numerous other modifications and optional features will occur to those skilled in the art whereby the versatility and convenience of the computer for performing particular operations can be increased without departing from broad principles of the present invention. Where electrical linkages are provided between the computer elements, great versatility may be obtained by making all or a part of the interconnections through an electrical plug board. Means may be provided for entering the input data automatically from punched cards or tape, or from other data-storage media.

It will be understood that this invention is not limited to specific embodiments herein illustrated and described, and that the following claims are intended to cover all changes and modifications which do not depart from the true spirit and scope of the invention.

What is claimed is:

1. Apparatus for controlling the three dimensional motion of a machine tool having control mechanisms operable to produce components of motion in the directions of three Cartesian coordinate axes, comprising means generating a V signal proportional to a desired speed of said three-dimensional motion, means adjustable to provide, $\psi$, $\theta$ and $\phi$ signals respectively proportional to three Euler coordinate angles defining the instantaneous direction of said three dimensional motion, and computing means controlled by said V, $\psi$, $\theta$ and $\phi$ signals to provide three other signals proportional to the velocity components of said motion in the directions of said Cartesian coordinate axes.

2. Apparatus for controlling a three dimensional motion along an arcuate trajectory of radius R, comprising means generating a V signal proportional to a desired speed of said motion, means adjustable to provide $\theta$ and $\phi$ signals respectively proportional to two angles defining the orientation of a plane containing said trajectory, means adjustable to provide a $\psi$ signal proportional to an angle defining the instantaneous direction of said motion within said plane, means automatically varying the value of said $\psi$ signal at a rate proportional to $V/R$, and computing means controlling by said V, $\psi$, $\theta$ and $\phi$ signals to provide three other signals respectively proportional to the velocity components of said motion in three mutually perpendicular directions.

3. Computing apparatus providing three time-varying signals $dX/dt$, $dY/dt$ and $dZ/dt$ respectively representing instantaneous rates of change in the three-dimensional rectangular coordinates of a point moving with a velocity V along an arcuate trajectory of radius R, said velocity having an instantaneous direction $\psi$ in a plane having an orientation with respect to said rectangular coordinates represented by two angles $\theta$ and $\phi$, comprising means providing four signals respectively proportional to V, $\psi$, $\theta$ and $\phi$, means varying the value of said $\psi$ signal at a rate proportional to $V/R$, a first component resolver receiving said V and $\psi$ signals and generating signals proportional to $V \sin \psi$ and $V \cos \psi$ respectively, a second component resolver receiving said $V \sin \psi$ and $\phi$ signals and generating signals proportional to $V \sin \psi \sin \phi$ and $V \sin \psi \cos \theta$ respectively, a third component resolver receiving said $V \cos \psi$ and $\theta$ signals and generating signals proportional to $V \cos \psi \sin \theta$ and $V \cos \psi \cos \theta$ respectively, a fourth component resolver receiving said $V \cos \psi \sin \theta$ and $\phi$ signals and generating signals proportional to $V \cos \psi \sin \theta \sin \phi$ and $V \cos \psi \sin \theta \cos \phi$ respectively, said $V \cos \psi \cos \theta$ signal representing $dX/dt$, means adding said $V \sin \psi \cos \phi$ and $V \cos \psi \sin \phi$ signals to provide a signal representing $dY/dt$, and means subtracting said $V \cos \psi \sin \theta \cos \phi$ signal from said $V \sin \psi \sin \phi$ signal to provide a signal representing $dZ/dt$.

4. A trajectory computer for computing the rectangular coordinates of a point moving at a speed V along an arcuate trajectory of radius R, comprising first, second and third mechanisms adjustable to positions representing the values of three angles $\psi$, $\theta$ and $\phi$ respectively, said angles defining the instantaneous direction of motion of said point, a fourth mechanism adjustable to a position representing the reciprocal of the radius R of said trajectory, a first shaft, means rotating said first shaft at an angular velocity proportional to V, an integrator having an input shaft and an output shaft and a ratio adjustment, means rotating the input shaft of said integrator at an angular velocity proportional to the angular velocity of said first shaft, means positioning the ratio adjustment of said integrator in accordance with the adjustment of said fourth mechanism so that the output shaft of said integrator rotates at an angular velocity proportional to $V/R$, means varying the adjustment of said first mechanism in accordance with rotation of the output shaft of said integrator for automatically adjusting the value of $\psi$ as said point moves along said trajectory, first, second, third and fourth component resolvers each having an input shaft and an angle adjustment and a sine output shaft and a cosine output shaft, means rotating the input shaft of said first component resolver at an angular velocity proportional to the angular velocity of said first shaft, means positioning the angle adjustment of said first component resolver in accordance with the adjustment of said first mechanism so that the sine output shaft of said first resolver rotates at an angular velocity proportional to $V \sin \psi$ and the cosine output shaft of said first resolver rotates at an angular velocity proportional to $V \cos \psi$, means rotating the input shaft of said second component resolver at an angular velocity proportional to the angular velocity of the cosine output shaft of said first resolver, means positioning the angle adjustment of said second component resolver in accordance with the adjustment of said second mechanism so that the sine output shaft of said second resolver rotates at an angular velocity proportional to $V \cos \psi \sin \theta$ and the cosine output shaft of said second resolver rotates at an angular velocity proportional to $V \cos \psi \cos \theta$, means rotating the input shaft of said third component resolver at an angular velocity proportional to the angular velocity of the sine output shaft of said first resolver, means positioning the angle adjustment of said third component resolver in accordance with the adjustment of said third mechanism so that the sine output shaft of said third resolver rotates at an angular velocity proportional to $V \sin \psi \sin \phi$ and the cosine output shaft of said third resolver rotates at an angular velocity proportional to $V \sin \psi \cos \phi$, means rotating the input shaft of said fourth component resolver at an angular velocity proportional to the angular velocity of the sine output shaft of said second resolver, means positioning the angle adjustment of said fourth component resolver in accordance with the adjustment of said third mechanism so that the sine output shaft of said fourth resolver rotates at an angular velocity proportional to $V \cos \psi \sin \theta \sin \phi$ and the cosine output shaft of said fourth resolver rotates at an angular velocity proportional to $V \cos \psi \sin \theta \cos \phi$, first differential means adding the angular velocity of the cosine output shaft of said third resolver to the angular velocity of the sine output shaft of said fourth resolver, and second differential means subtracting the angular velocity of the cosine output shaft of said fourth resolver from the angular velocity of the sine output shaft of said third resolver.

5. A trajectory computer providing a plurality of time-varying signals representing the instantaneous coordinates of a point moving from a first position to a second position along a desired trajectory, comprising analogue computer mechanism for progressively varying the values of said time-varying signals automatically in approximate correspondence with computed time-varying instantaneous coordinates required to move said point along said trajectory to said second position, means providing a plurality of constant signals corresponding to the coordinates of said second position, whereby there is provided for each coordinate axis a pair of signals of which one is time-varying and the other is constant, means comparing the time-varying signal with the constant signal in one of said pairs until such time as the signals so compared have equal values, and means displaying the differences at such time between the values of the signals in each other one of said pairs, said differences at such time revealing the degree of accuracy of operation of said analog computer mechanism.

6. A trajectory computer providing three time-varying signals X, Y and Z representing the instantaneous Cartesian coordinates of a point moving from a first position to a second position along a desired trajectory, comprising means for adjusting the initial values $Xo$, $Yo$ and $Zo$ of said time-varying signals to correspond to the Cartesian coordinates of said first position, an analogue computer operable to vary progressively the values of said time-varying signals automatically in correspondence with computed time-varying instantaneous Cartesian coordinates required to move said point along said trajectory to said second position, means providing three constant signals $Xn$, $Yn$ and $Zn$ corresponding to the Cartesian coordinates of said second position, means continuously registering the three differences $Xn-X$, $Yn-Y$ and $Zn-Z$ between said constant signals and the corresponding ones of said time-varying signals, and means for automatically stopping the operation of said analogue computer when any one of said differences becomes zero, the other two differences registered when the computer stops revealing the degree of accuracy of operation of said analog computer.

7. A trajectory computer comprising three rotative shafts having instantaneous angular positions representing three coordinates defining the instantaneous three-dimensional position of a point moving along a desired trajectory, means for adjusting the initial angular positions of said shafts individually to values representing the coordinates of an initial position of said point on said trajectory, an analogue computer operable to rotate said three shafts individually to vary the instantaneous angular positions of said shafts as computed functions of time approximately defining the motion of said point, adjustable means registering desired terminal angular positions of said three shafts representing a terminal position of said point on said trajectory, and means registering the differences between said terminal angular positions and said instantaneous positions, said differences each approaching zero as said point approaches its said terminal position, whereby the relation of said differences as they approach zero reveals the degree of accuracy of operation of said analog computer.

8. Apparatus for controlling the three dimensional motion of a machine tool having control mechanisms operable to produce components of tool motion in the directions of three Cartesian coordinate axes, comprising means generating a V signal proportional to a desired speed of said three-dimensional motion, means adjustable to provide $\psi$, $\theta$ and $\phi$ signals respectively proportional to three Euler coordinate angles defining the instantaneous direction of said three-dimensional motion, computing means controlled by said V, $\psi$, $\theta$ and $\phi$ signals to provide time-varying X, Y and Z signals respectively proportional to Cartesian coordinate values defining the instantaneous position of said tool, means providing $Xn$, $Yn$ and $Zn$ reference signals proportional to Cartesian coordinate values defining a desired terminal position of said tool, and means registering the differences $Xn-X$, $Yn-Y$ and $Zn-Z$ between said reference signals and corresponding ones of said time-varying signals.

9. Apparatus for controlling the three-dimensional motion of a machine tool relative to a work piece, the desired motion being from a first position to a second position at a speed V along an arcuate trajectory of radius R, comprising first, second and third mechanisms individually adjustable to positions representing the values of three angles $\psi$, $\theta$ and $\phi$ respectively, said angles defining the instantaneous direction of said motion, a fourth mechanism adjustable to a position representing the reciprocal of said radius R, means producing a first signal proportional to said velocity V, means controlled jointly by said first signal and by said fourth mechanism for changing the adjustment of said first mechanism to vary the value of $\psi$ at a rate proportional to $V/R$, a plurality of component resolvers controlled jointly by said first signal and by said first, second and third mechanisms to provide time-varying X, Y and Z signals proportional to Cartesian coordinate values defining the desired instantaneous positions of said tool, adjustable means producing $Xn$, $Yn$ and $Zn$ reference signals proportional to the Cartesian coordinate values of said second position, means continuously registering the differences $Xn-X$, $Yn-Y$ and $Zn-Z$ between said reference signals and said time-varying signals, and means controlling the motion of said tool in accordance with the time-varying values of said X, Y and Z signals.

10. Computing apparatus for producing signals to control a motion along an arcuate trajectory, comprising first adjustable means for selecting a radius of said trajectory, second adjustable means for selecting an angle defining the initial direction of said motion in a plane containing said trajectory, means for providing a first computer signal representing the speed of said motion, means responsive to said second adjustable means for providing a second computer signal initially representing said selected angle, integrator means responsive jointly to said first computer signal and said first adjustable means and operable automatically to vary said second computer signal at a rate proportional to said speed divided by said radius so that said second computer signal continuously represents a variable angle defining the instantaneous direction of said motion in said plane, first resolver means responsive jointly to said first and second computer signals and operable automatically to provide a first control signal proportional to said speed times the cosine of an angle between the instantaneous direction of said motion and a first coordinate axis, and second resolver means responsive jointly to said first and second computer signals and operable automatically to provide a second control signal proportional to said speed times the cosine of an angle between the instantaneous direction of said motion and a second coordinate axis.

11. Apparatus for computing parametric expressions for the coordinates of a curve, comprising first input means adjustable to represent the coordinates of a first fixed point on said curve, second input means adjustable to represent the coordinates of a second fixed point on said curve, means for supplying a first signal representative of a progressively changing parameter, analog computer means responsive jointly to said first input means and said first signal, said computer means being operable automatically to supply varying signals representing the instantaneous coordinates of a moving point moving approximately along said curve from said first fixed point toward said second fixed point in accordance with the changing values of said parameter, means for stopping said computer means automatically when a coordinate of said moving point becomes equal to the corresponding coordinate of said second fixed point, and means for displaying the differences between the other coordinates of said moving point and the corresponding other coordinates of said second fixed point, said differences revealing the degree of accuracy of operation of said analog computer means.

References Cited in the file of this patent

UNITED STATES PATENTS 1,170,157    Huebner _______________ Feb. 1, 1916

UNITED STATES PATENT OFFICE
Certificate of Correction

Patent No. 2,852,189                                                                        September 16, 1958

Carl H. Becker et al.

It is hereby certified that error appears in the printed specification of the above numbered patent requiring correction and that the said Letters Patent should read as corrected below.

Column 6, line 14, for "$Y_\theta O Y_\phi$" read $X_\theta O Y_\phi$; line 56, for "desires" read *desired*; column 13, line 39, for "swtiches" read *switches*; column 14, line 60, for "trajector" read *trajectory*; column 15, line 23, for "of", first occurrence, read *or*; line 59, for "side" read *slide*; column 17, line 28, for "cos $\theta$ respectively" read *cos $\phi$ respectively*.

Signed and sealed this 23rd day of December 1958.

[SEAL]

Attest:
KARL H. AXLINE,
*Attesting Officer.*

ROBERT C. WATSON,
*Commissioner of Patents.*